US011315266B2

(12) United States Patent
Yan et al.

(10) Patent No.: US 11,315,266 B2
(45) Date of Patent: Apr. 26, 2022

(54) SELF-SUPERVISED DEPTH ESTIMATION METHOD AND SYSTEM

(71) Applicant: Robert Bosch GmbH, Stuttgart (DE)

(72) Inventors: Zhixin Yan, Sunnyvale, CA (US); Liang Mi, Emeryville, CA (US); Liu Ren, Cupertino, CA (US)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 16/716,077

(22) Filed: Dec. 16, 2019

(65) Prior Publication Data

US 2021/0183083 A1 Jun. 17, 2021

(51) Int. Cl.
*G06T 7/50* (2017.01)
*G06T 7/11* (2017.01)
*G06N 3/04* (2006.01)
*G06T 5/00* (2006.01)

(52) U.S. Cl.
CPC ............. *G06T 7/50* (2017.01); *G06N 3/0454* (2013.01); *G06T 5/002* (2013.01); *G06T 7/11* (2017.01); *G06T 2207/10028* (2013.01); *G06T 2207/20084* (2013.01)

(58) Field of Classification Search
None
See application file for complete search history.

(56) References Cited

U.S. PATENT DOCUMENTS

| | | | | |
|---|---|---|---|---|
| 7,653,247 B2* | 1/2010 | Jung | ........................ | G06T 7/11 382/201 |
| 9,083,960 B2* | 7/2015 | Wagner | ................ | H04N 13/271 |
| 10,222,211 B2* | 3/2019 | Chen | .................... | G05D 1/0088 |
| 10,488,500 B2* | 11/2019 | Zhu | .......................... | G01S 17/86 |
| 10,580,158 B1* | 3/2020 | Mousavian | ........ | G06K 9/00201 |
| 11,037,051 B2* | 6/2021 | Kim | .......................... | G06T 7/50 |
| 2015/0049915 A1* | 2/2015 | Ciurea | ................. | H04N 13/232 382/106 |
| 2016/0209846 A1* | 7/2016 | Eustice | ..................... | G06T 7/75 |

(Continued)

OTHER PUBLICATIONS

Fang, Zhuoqun, et al. "Superpixel Segmentation Using Weighted Coplanar Feature Clustering on RGBD Images." Applied Sciences 8.6 (2018): 902. (Year: 2018).*

(Continued)

*Primary Examiner* — Andrae S Allison
(74) *Attorney, Agent, or Firm* — Brooks Kushman P.C.

(57) ABSTRACT

Depth perception has become of increased interest in the image community due to the increasing usage of deep neural networks for the generation of dense depth maps. The applications of depth perception estimation, however, may still be limited due to the needs of a large amount of dense ground-truth depth for training. It is contemplated that a self-supervised control strategy may be developed for estimating depth maps using color images and data provided by a sensor system (e.g., sparse LiDAR data). Such a self-supervised control strategy may leverage superpixels (i.e., group of pixels that share common characteristics, for instance, pixel intensity) as local planar regions to regularize surface normal derivatives from estimated depth together with the photometric loss. The control strategy may be operable to produce a dense depth map that does not require a dense ground-truth supervision.

18 Claims, 5 Drawing Sheets

(56) References Cited

U.S. PATENT DOCUMENTS

| | | | | |
|---|---|---|---|---|
| 2017/0278289 | A1* | 9/2017 | Marino | G06T 11/60 |
| 2019/0147245 | A1* | 5/2019 | Qi | G06K 9/3233 |
| | | | | 382/103 |
| 2019/0287254 | A1* | 9/2019 | Lakshmi Narayanan | |
| | | | | G06T 5/002 |

OTHER PUBLICATIONS

Ma, Fangchang, and Sertac Karaman. "Sparse-to-dense: Depth prediction from sparse depth samples and a single image." 2018 IEEE international conference on robotics and automation (ICRA). IEEE, 2018. (Year: 2018).*

Yang, Zhenheng, et al. "Unsupervised learning of geometry from videos with edge-aware depth-normal consistency." Thirty-Second AAAI conference on artificial intelligence. 2018. (Year: 2018).*

Zhang, Xitong. "vU-net: edge detection in time-lapse fluorescence live cell images based on convolutional neural networks." (2018); https://web.wpi.edu/Pubs/ETD/Available/etd-042318-204019/unrestricted/xzhang.pdf. (Year: 2018).*

Shen T, Luo Z, Zhou L, Deng H, Zhang R, Fang T, Quan L. Beyond photometric loss for self-supervised ego-motion estimation. In2019 International Conference on Robotics and Automation (ICRA) May 20, 2019 (pp. 6359-6365). IEEE. (Year: 2019).*

Qiu, Jiaxiong, et al. "Deeplidar: Deep surface normal guided depth prediction for outdoor scene from sparse lidar data and single color image." Proceedings of the IEEE/CVF Conference on Computer Vision and Pattern Recognition. 2019. (Year: 2019).*

D. Eigen, C. Puhrsch, and R. Fergus, "Depth map prediction from a single image using a multi-scale deep network," in Advances in neural information processing systems, 2014, pp. 2366-2374.

Mal and S. Karaman, "Sparse-to-dense: Depth prediction from sparse depth samples and a single image," in 2018 IEEE International Conference on Robotics and Automation (ICRA). IEEE, 2018, pp. 1-8.

Y. Zhang and T. Funkhouser, "Deep depth completion of a single rgbd image," in Proceedings of the IEEE Conference on Computer Vision and Pattern Recognition, 2018, pp. 175-185.

T. Zhou, M. Brown, N. Snavely, and D. G. Lowe, "Unsupervised learning of depth and ego-motion from video," in Proceedings of the IEEE Conference on Computer Vision and Pattern Recognition, 2017, pp. 1851-1858.

C. Godard, O. Mac Aodha, and G. J. Brostow, "Unsupervised monocular depth estimation with leftright consistency," in Proceedings of the IEEE Conference on Computer Vision and Pattern Recognition, 2017, pp. 270-279.

F. Ma, G. V. Cavalheiro, and S. Karaman, "Self-supervised sparseto-dense: Self-supervised depth completion from lidar and monocular camera," in 2019 International Conference on Robotics and Automation (ICRA). IEEE, 2019, pp. 3288-3295.

J. Qiu, Z. Cui, Y. Zhang, X. Zhang, S. Liu, B. Zeng, and M. Pollefeys, "Deeplidar: Deep surface normal guided depth prediction for outdoor scene from sparse lidar data and single color image," in The IEEE ConferenceonComputerVisionandPatternRecognition(CVPR),Jun. 2019.

X. Qi, R. Liao, Z. Liu, R. Urtasun, and J. Jia, "Geonet: Geometric neural network for joint depth and surface normal estimation," in Proceedings of the IEEE Conference on Computer Vision and Pattern Recognition, 2018, pp. 283-291.

J. Uhrig, N. Schneider, L. Schneider, U. Franke, T. Brox, and A. Geiger, "Sparsity invariant cnns," in 2017 International Conference on 3D Vision (3DV). IEEE, 2017, pp. 11-20.

N. Silberman, D. Hoiem, P. Kohli, and R. Fergus, "Indoor segmentation and support inference from rgbd images," in European Conference on Computer Vision. Springer, 2012, pp. 746-760.

T. Kanade and M. Okutomi, "A stereo matching algorithm with an adaptive window: Theory and experiment," IEEE transactions on pattern analysis and machine intelligence, vol. 16, No. 9, pp. 920-932, 1994.

J. Sun, N.-N. Zheng, and H.-Y. Shum, "Stereo matching using belief propagation," IEEE Transactions on Pattern Analysis & Machine Intelligence, No. 7, pp. 787-800, 2003.

S. M. Seitz, B. Curless, J. Diebel, D. Scharstein, and R. Szeliski, "A comparison and evaluation of multi-view stereo reconstruction algorithms," in 2006 IEEE Computer Society Conference on Computer Vision and Pattern Recognition (CVPR'06), vol. 1. IEEE, 2006, pp. 519-528.

D. Hoiem, A. A. Efros, and M. Hebert, "Automatic photo pop-up," in ACM transactions on graphics (TOG), vol. 24, No. 3. ACM, 2005, pp. 577-584.

D. Hoiem, A. N. Stein, A. A. Efros, and M. Hebert, "Recovering occlusion boundaries from a single image," in 2007 IEEE 11th International Conference on Computer Vision. IEEE, 2007, pp. 1-8.

S. Song, S. P. Lichtenberg, and J. Xiao, "Sun rgb-d: A rgb-d scene understanding benchmark suite," in Proceedings of the IEEE conference on computer vision and pattern recognition, 2015, pp. 567-576.

I. Laina, C. Rupprecht, V. Belagiannis, F. Tombari, and N. Navab, "Deeper depth prediction with fully convolutional residual networks," in 2016 Fourth international conference on 3D vision (3DV). IEEE, 2016, pp. 239-248.

D.EigenandR.Fergus,"Predictingdepth,surfacenormalsandsemantic labels with a common multi-scale convolutional architecture," in Proceedings of the IEEE international conference on computer vision, 2015, pp. 2650-2658.

X.Cheng,P. Wang,andR.Yang,"Depthestimationviaaffinitylearned with convolutional spatial propagation network," in Proceedings of the European Conference on Computer Vision (ECCV), 2018, pp. 103-119.

Z. Yang, P. Wang, Y. Wang, W. Xu, and R. Nevatia, "Lego: Learning edge with geometry all at once by watching videos," in Proceedings of the IEEE Conference on Computer Vision and Pattern Recognition, 2018, pp. 225-234.

X. Fei, A. Wong, and S. Soatto, "Geo-supervised visual depth prediction," IEEE Robotics and Automation Letters, vol. 4, No. 2, pp. 1661-1668, 2019.

X. Ren and J. Malik, "Learning a classification model for segmentation," in Proceedings of the Ninth IEEE International Conference on Computer Vision. IEEE, 2003, p. 10.

B. Fulkerson, A. Vedaldi, and S. Soatto, "Class segmentation and object localization with superpixel neighborhoods," in 2009 IEEE 12th international conference on computer vision. IEEE, 2009, pp. 670-677.

P. Arbelaez, M. Maire, C. Fowlkes, and J. Malik, "Contour detection and hierarchical image segmentation," IEEE transactions on pattern analysis and machine intelligence, vol. 33, No. 5, pp. 898-916, 2010.

W.-C. Tu, M.-Y. Liu, V. Jampani, D. Sun, S.-Y. Chien, M.-H. Yang, and J. Kautz, "Learning superpixels with segmentation-aware affinity loss," in Proceedings of the IEEE Conference on Computer Vision and Pattern Recognition, 2018, pp. 568-576.

V. Jampani, D. Sun, M.-Y. Liu, M.-H. Yang, and J. Kautz, "Superpixel sampling networks," in Proceedings of the European Conference on Computer Vision (ECCV), 2018, pp. 352-368.

R. Mur-Artal and J. D. Tard'os, "ORB-SLAM2: an open-source SLAM system for monocular, stereo and RGB-D cameras," IEEE Transactions on Robotics, vol. 33, No. 5, pp. 1255-1262, 2017.

J. Wu, Y. Wang, T. Xue, X. Sun, B. Freeman, and J. Tenenbaum, "Marrnet: 3d shape reconstruction via 2.5 d sketches," in Advances in neural information processing systems, 2017, pp. 540-550.

Y. Meng, Y. Lu, A. Raj, S. Sunarjo, R. Guo, T. Javidi, G. Bansal, and D. Bharadia, "Signet: Semantic instance aided unsupervised 3d geometry perception," in Proceedings of the IEEE Conference on Computer Vision and Pattern Recognition, 2019, pp. 9810-9820.

Z. Yang, P. Wang, W. Xu, L. Zhao, and R. Nevatia, "Unsupervised learning of geometry with edgeaware depth-normal consistency," arXiv preprint arXiv:1711.03665, 2017.

A. Geiger, P. Lenz, and R. Urtasun, "Are we ready for autonomous driving? the kitti vision benchmark suite," in Conference on Computer Vision and Pattern Recognition (CVPR), 2012.

(56) References Cited

OTHER PUBLICATIONS

A. Paszke, S. Gross, S. Chintala, G. Chanan, E. Yang, Z. DeVito, Z. Lin, A. Desmaison, L. Antiga, and A. Lerer, "Automatic differentiation in PyTorch," in NIPS Autodiff Workshop, 2017.

D. P. Kingma and J. Ba, "Adam: A method for stochastic optimization," in International Conference on Learning Representations (ICLR), 2015.

A. Pilzer, S. Lathuili'ere, N. Sebe, and E. Ricci, "Refine and distill: Exploiting cycle-inconsistency and knowledge distillation for unsupervised monocular depth estimation," arXiv preprint arXiv:1903.04202, 2019.

N. Schneider, L. Schneider, P. Pinggera, U. Franke, M. Pollefeys, and C. Stiller, "Semantically guided depth upsampling," in German Conference on Pattern Recognition. Springer, 2016, pp. 37-48.

\* cited by examiner

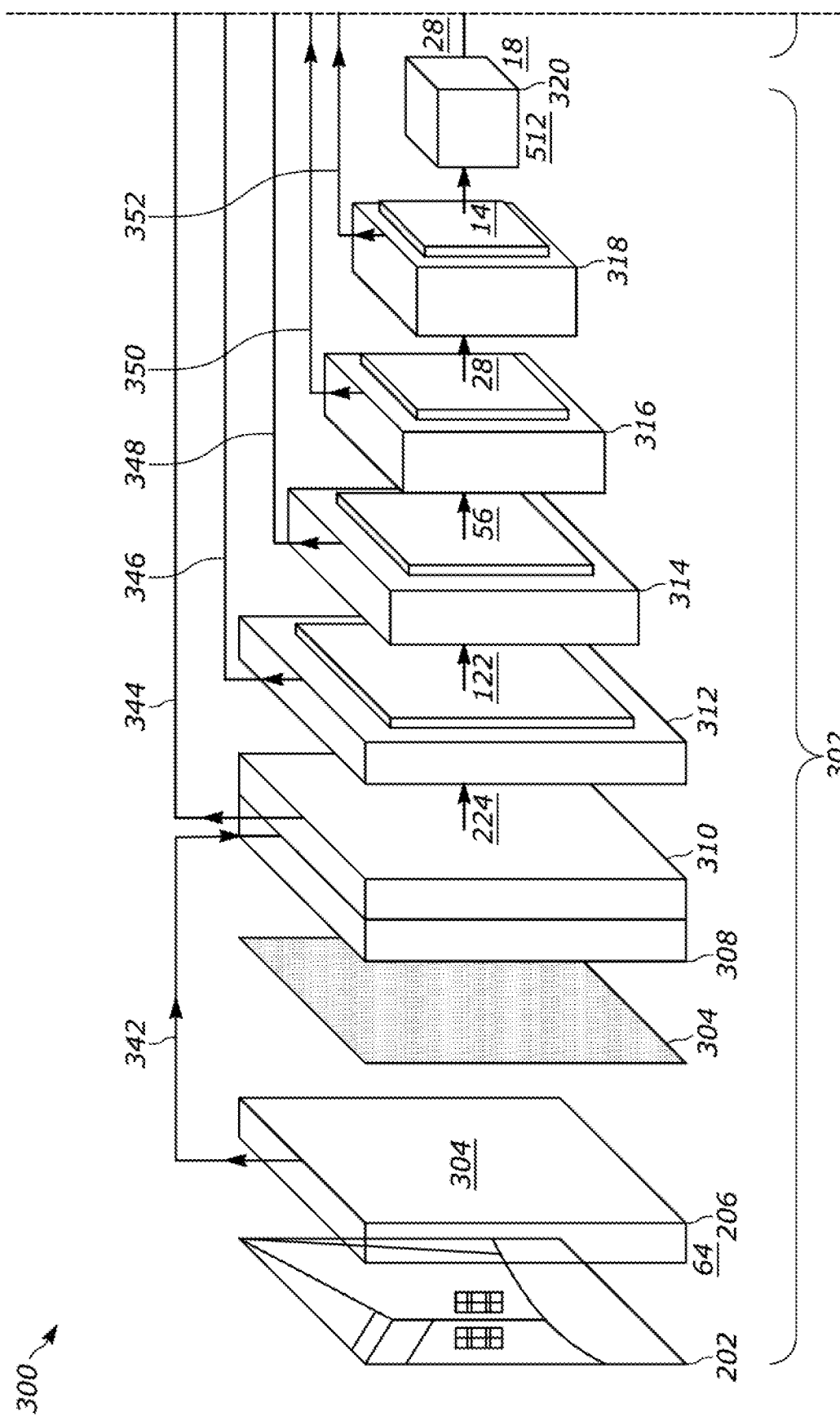

SELF-SUPERVISED DEPTH ESTIMATION METHOD AND SYSTEM

TECHNICAL FIELD

The following relates generally to a self-supervised depth estimation system and method for generating dense depth maps.

BACKGROUND

Dense and accurate depth maps are generally required for applications like autonomous driving. However, high-quality and high-cost sensors and capturing devices are usually required to generate such dense and accurate depth maps. The cost of these sensors and capturing devices make dense and accurate depth map usage cost prohibitive for many applications.

SUMMARY

A system and method for self-supervised depth estimation that receives a digital image of an environment. One or more deep superpixel segmentations may be extracted from the digital image, and the deep superpixel segmentations may be partitioned to represent a homogenous area of the digital image. The deep superpixel segmentations may also be operable as local planar regions that constrain a local normal direction and a secondary derivative of depth within the one or more deep superpixel segmentations. Lastly, a dense depth map may be generated using the one or more deep superpixel segmentations.

The system and method may also derive a surface normal map using a depth regression neural network that regresses a full resolution depth map from the digital image and a sparse depth map sample received from depth sensor. The depth regression neural network may also be designed using an encoder-decoder structure having an encoding layer, a decoding layer, and a plurality of skip connections. The encoding layer may include one or more convolutional layers, one or more ReLU layers, one or more residual neural networks (ResNet), and one or more pooling layers. And, the decoding layer may include one or more deconvolutional layers, one or more unpooling layers, one or more ResNet layers, and one or more ReLU layers. A final convolution layer may also operate to produce a non-negative gray-scale depth image that is used to derive the surface normal map.

The system and method may further be operable to compute a gradient of the sparse depth map sample in four directions. The sparse depth map sample may be converted into one or more 3-dimensional vectors. The system and method may average one or more normalized cross products of the one or more 3-dimensional vectors to determine a vertex normal.

The system and method may be operable to determine a relative transformation between the digital image and a related image using a simultaneous localization and mapping system. A photometric loss may be determined using the relative transformation, the digital image, and the related image. The system and method may also be operable to smooth and suppress inconsistencies within the dense depth map by minimizing a depth secondary derivative within the one or more deep superpixel segmentations. The system and method may determine local normal directions is derived using an estimated depth. The system and method may negate a boundary and an edge within the one or more superpixel segmentations. Lastly, the system and method may apply a consistency of normal direction within each of the one or more deep superpixel segmentations.

BRIEF DESCRIPTION OF THE DRAWINGS

FIGS. 3A and 3B illustrate an encoder-decoder structure that may be implemented by a depth regression network.

DETAILED DESCRIPTION

Figure 1:
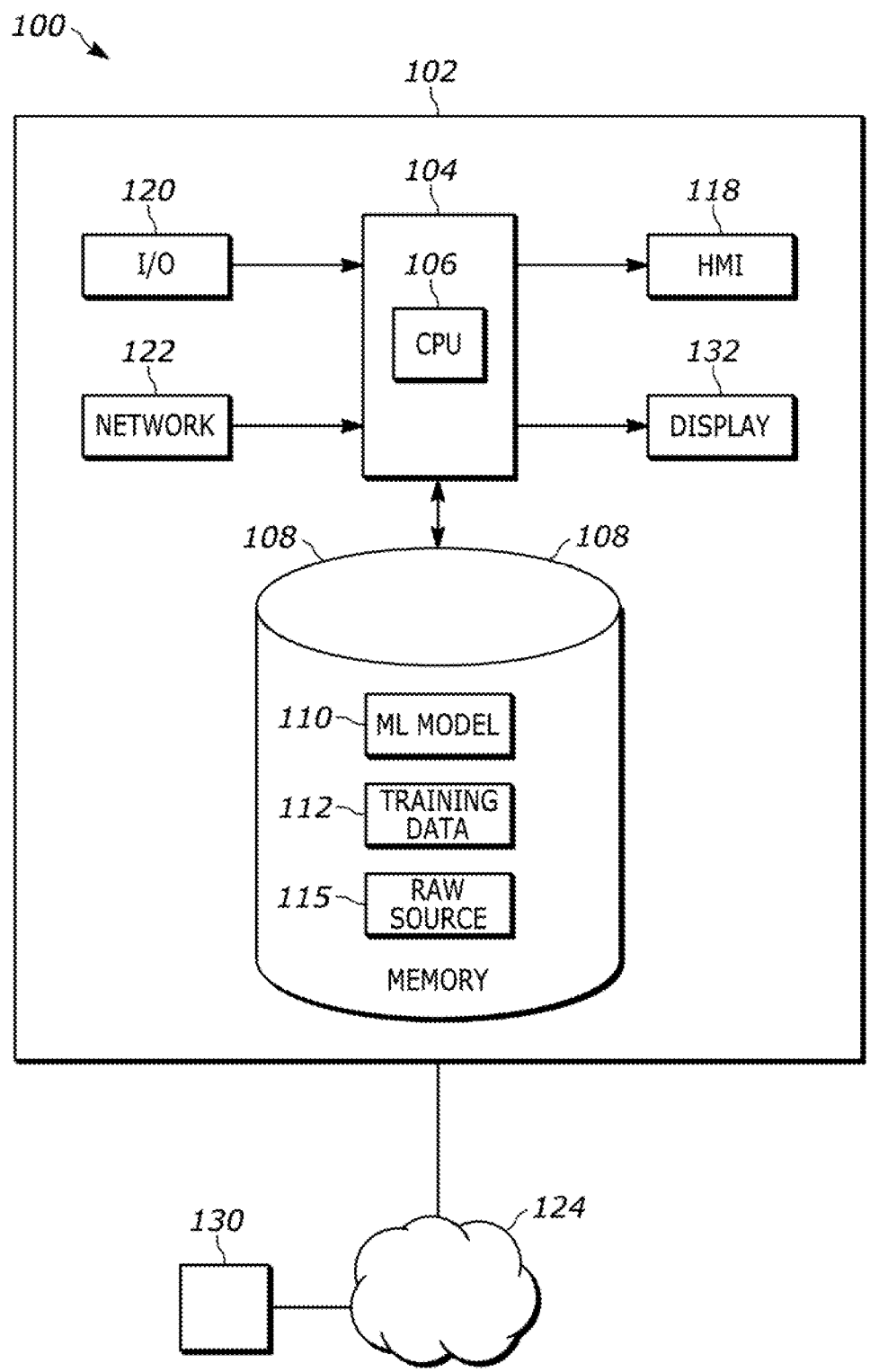
FIG. 1 depicts an exemplary computing system.

As required, detailed embodiments are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present embodiments.

Depth perception is generally understood as a visual ability to perceive the world in three dimensions (3D) and the distance of an object. Depth perception may be determined from a variety of depth images and cues. For instance, depth perception may include binocular images that may be based on the receipt of sensory information in three dimensions and monocular images that includes images represented in just two dimensions.

Depth maps that include an image or image channel that contains information relating to the distance of the surfaces of scene objects from a viewpoint may also be used in determining depth perception. For instance, a dense and accurate depth map may be used for capturing an indoor or outdoor environment. It is contemplated that dense depth maps may be useful for applications that include 3-D object reconstruction, augmented reality, robotics manipulation, and autonomous driving. It is also contemplated that 3-D image capturing techniques and sensors (e.g., LiDAR) may be operable to provide the 3-D data that is used to generate the dense depth maps.

However, LiDAR sensors that are operable to produce high-quality dense depth map may be cost-prohibitive for certain applications. Lower-cost LiDAR sensors may, on the other hand, not provide the accuracy and resolution necessary for accurate dense depth maps. It is also contemplated that alternative 3-D capturing solutions (e.g., depth cameras) may have similar cost and performance trade-offs as the LiDAR sensors. To increase the number of applications for 3-D capturing, it is contemplated that lower cost and lower-quality depth sensor would be desirable. However, to implement lower cost and quality depth sensors more robust algorithms may need to be developed that estimate depth maps at greater resolution from sparse depth map sample $204s$ (or even minimal to no samples) to compensate the resolution of lower-quality 3-D capturing devices.

With the rapid growth of deep learning, depth estimation algorithms may take advantage of deep neural networks to generate depth maps from monocular color images and/or sparse depth datasets. These algorithms may rely on dense ground-truth depth maps as supervision during the network training. Such ground-truth data generally include information that may be provided by direct observation (i.e. empirical evidence) as opposed to information provided by inference.

However, the dependence of dense ground-truth depth maps may not be optimal because the initial purpose of depth perception estimation is to reduce the need for such dense depth maps. When applying estimation algorithms to a new application or environment, the performance may therefore be limited due to the lack of these ground-truth dense maps. Self-supervised learning may sometimes overcome such performance constraints by utilizing geometric constraints between pairs of consecutive images. But self-supervised depth estimations may have much lower accuracy because the geometric constraint may not be as accurate as ground-truth depth maps.

To enhance the dense depth maps from self-supervised algorithms, stronger supervisions of the ground-truth depth maps has been explored in addition to the image-only geometric constraint-based solution. For instance, sparse depth measurements captured by low-end LiDAR is one approach that may be employed. With sparse depth measurements providing supervisions, image appearance ambiguity (e.g., repeated patterns) may be overcome. Or, multi-task learning that is trained to learn multiple modalities (e.g., normal, optical flow) may be used to improve depth quality and reduce model over-fitting.

FIG. 1 depicts an exemplary system 100 that may be used to implement a self-supervised depth estimation network for estimating depth maps based on color images and sparse LiDAR samples. The system 100 may include at least one computing devices 102. The computing system 102 may include at least one processor 104 that is operatively connected to a memory unit 108. The processor 104 may be one or more integrated circuits that implement the functionality of a central processing unit (CPU) 106. It should be understood that CPU 106 may also be one or more integrated circuits that implement the functionality of a general processing unit or a specialized processing unit (e.g., graphical processing unit, ASIC, FPGA).

The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, training dataset 112 for the machine-learning model 110, and/or raw source data 115.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors.

The system 100 may implement a machine-learning algorithm 110 that is configured to analyze the raw source data 115. The raw source data 115 may include raw or unprocessed sensor data that may be representative of an input dataset for a machine-learning system. The raw source data 115 may include video, video segments, images, and raw or partially processed sensor data (e.g., data from digital camera or LiDAR sensor). In some examples, the machine-learning algorithm 110 may be a neural network algorithm that is designed to perform a predetermined function. For example, the neural network algorithm may be configured in automotive applications to identify objects (e.g., pedestrians) from images provided from a digital camera and/or depth map from a LiDAR sensor.

The system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In this example, the training dataset 112 may include source images and depth maps from various scenarios in which objects (e.g., pedestrians) may be identified.

The machine-learning algorithm 110 may be operated in a learning mode using the training dataset 112 as input. The machine-learning algorithm 110 may be executed over a number of iterations using the data from the training dataset 112. With each iteration, the machine-learning algorithm 110 may update internal weighting factors based on the achieved results. For example, the machine-learning algorithm 110 can compare output results with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may also be configured to identify a particular feature in the raw source data 115. The raw source data 115 may include a plurality of instances or input dataset for which annotation results are desired. For example, the machine-learning algorithm 110 may be configured to identify the presence of a pedestrian in images and annotate the occurrences. The machine-learning algorithm 110 may be programmed to process the raw source data 115 to identify the presence of the particular features. The machine-learning algorithm 110 may be configured to identify a feature in the raw source data 115 as a predetermined feature. The raw source data 115 may be derived from a variety of sources. For example, the raw source data 115 may be actual input data collected by a machine-learning system. The raw source data 115 may be machine generated for testing the system. As an example, the raw source data 115 may include raw digital images from a camera.

In the example, the machine-learning algorithm 110 may process raw source data 115 and generate an output. A machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

Figure 2:
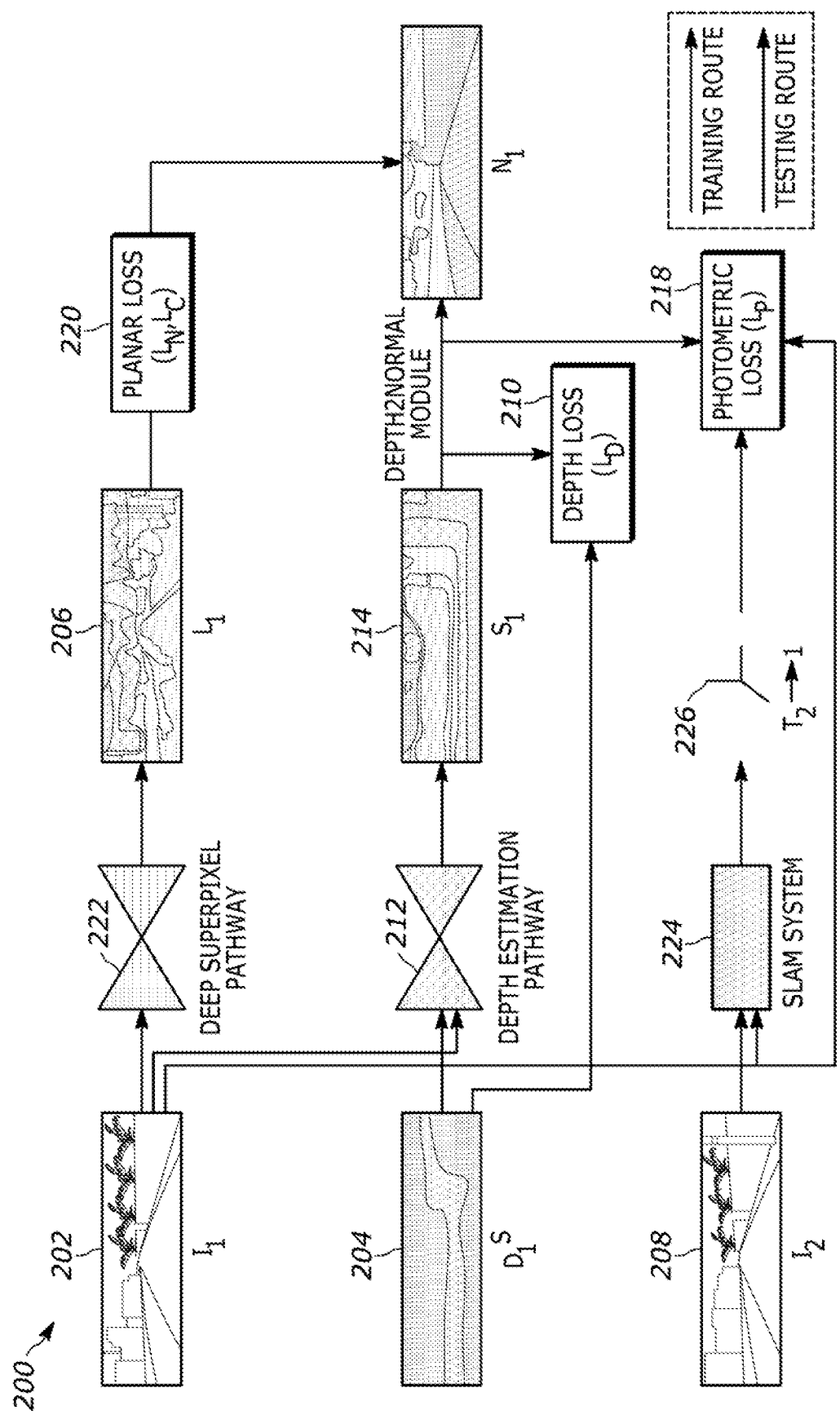
FIG. 2 illustrates an exemplary self-supervised depth estimation network.

FIG. 2 illustrates a self-supervised depth estimation network 200 representative of the machine-learning algorithm 110. It is contemplated that the self-supervised depth estimation network 200 may be operable to estimate a depth map from color images that includes constraints from varying sources and modalities to improve depth quality and reduce model over-fitting.

It is contemplated that network 200 may receive one or more color images 202 (i.e., two-dimensional or three-dimensional RGB color images) from a digital camera or video camera operable to capture and/or generate RGB images (e.g., a DSLR camera or mirrorless digital camera). Network 200 may also receive a sparse depth map sample 204 which may be provided by a high- or low-resolution depth sensor (e.g., LiDAR sensor). Network 200 may be operable to leverage the color image 202, the sparse depth map sample 204, an extracted deep superpixel 206, and a closely related color image 208 as the data 115 provided for training the machine-learning algorithm 110.

Network 200 may also include several network pathways. For instance, network 200 may include a depth loss pathway 210 where the color image 202 and its corresponding sparse depth map sample 204 are passed into a depth regression pathway 212 which may produce a dense depth map 214 and a derived surface normal map 216. It is contemplated the depth regression pathway 212 may output the dense depth map 214 (that includes an estimated depth (d) for each pixel) by utilizing the color image 202 and the sparse depth map sample 204 (i.e., sample provided by LiDAR sensor). It is also contemplated that the depth regression pathway 212 may be regularized using several cues obtained from the input during a training routine. For instance, the cues may include superpixels, neighboring images, and camera poses.

Figure 3B:
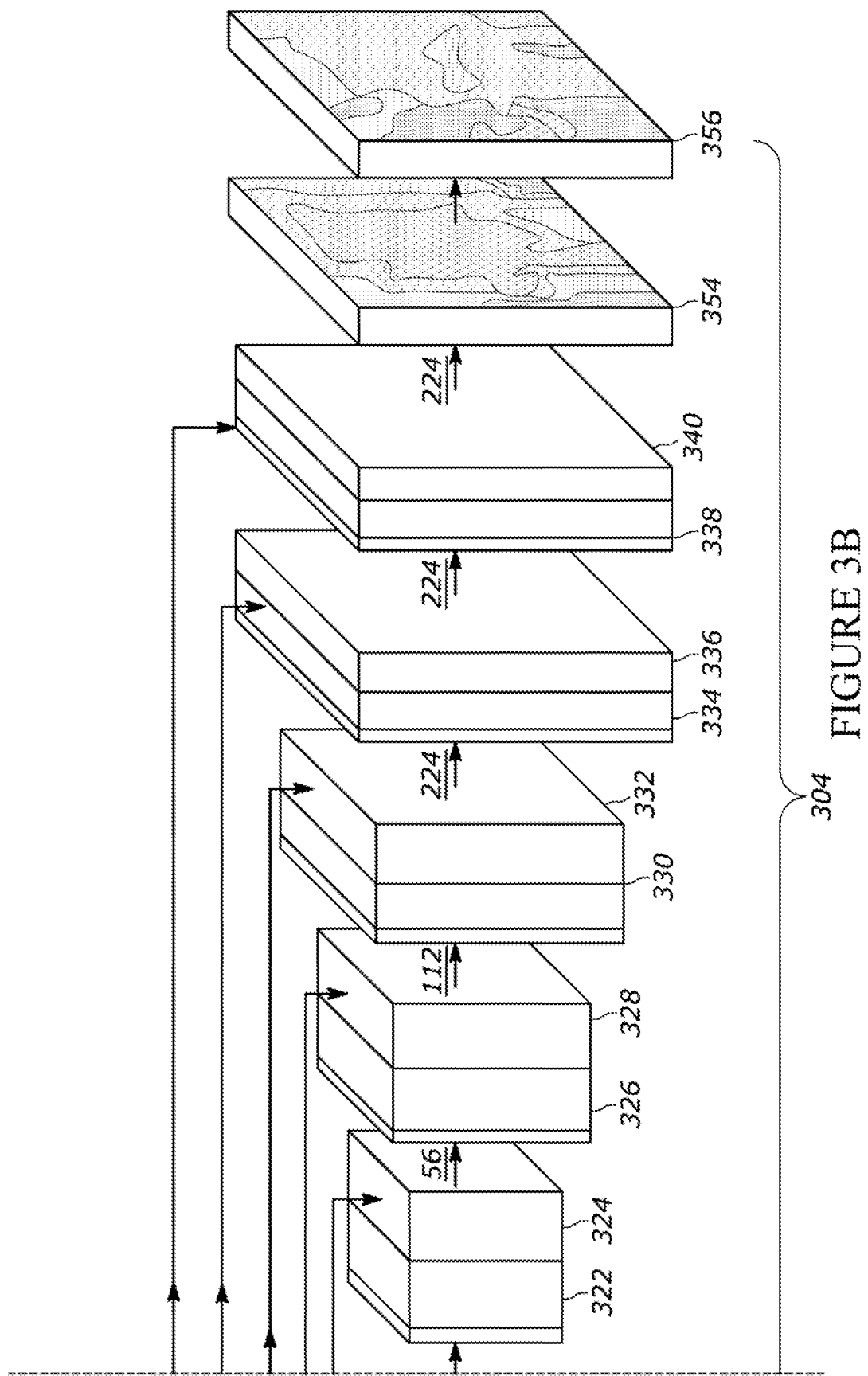

FIG. 3 illustrates a convolutional neural network (CNN) 300 that may be used as the depth regression pathway 212. CNN 300 may be designed using an encoder-decoder structure and skip connections to provide enhanced performance for image-to-image regression.

As illustrated, CNN 300 includes one or more encoder layers 302 and one or more decoder layers 304. The encoder layers 302 may include one or more convolutional layers followed by an activation function (e.g., a rectified linear unit (ReLU) function). For instance, CNN 300 may input the color image 202 to layer 306 which includes a convolutional layer and ReLU activation function. Likewise, CNN 300 may input the sparse depth map sample 204 to layer 308 which may include a separate convolutional layer and ReLU activation function. It is contemplated that layers 306-308 may include convolution layers having kernels of the same size (e.g., 64×304). It is also contemplated that color image 202 and sparse depth map sample 204 may be provided to a single layer (e.g., layer 306) having the same convolutional layer and ReLU activation function instead of separate layers having separate convolutional layers and ReLU activation functions. Layers 306 and 308 may then be provided to layer 310 which may include a residual neural network (ResNet) and ReLU activation function. Layer 310 may also be designed as having the same size and dimension (e.g., 64×304) as layers 306-308.

Encoding layer 302 may also include one or more additional layers 312-318. Each additional layer (e.g., layer 312) may include a ResNet layer, a ReLU activation function, and a pooling layer. It is contemplated that each layer 312-318 may vary in size and the size of each layer 312-318 may be dependent on the size of the image 202 and the sparse depth map sample 204. For instance, color image 202 and sparse depth map sample 204 may include 64-channel features which are concatenated and fed into layers 312-318. Layers 312-318 may then be designed to down-sample each received feature map by half. Layer 310 may provide a feature map having a size of 324 which is down-sampled by layer 312 to a size of 212. Layer 312 may provide a feature map having the size of 212 which is down-sampled by layer 314 to a size of 56. Layer 314 may provide a feature map having the size of 56 which is down-sampled by layer 316 to a size of 28. Layer 316 may provide a feature map having the size of 28 which is down-sampled by layer 318 to a size of 14. Layer 320 having an additional convolutional layer and ReLU activation function layer may receive the feature map from layer 318 and further down-sample the number of features to 512.

The convolutional layer 320 then provides features to decoder layer 304. It is contemplated that the decoder layer

2014 includes one or more layers 322-360. Each layer (e.g., layer 322) may be designed to include an unpooling layer, a deconvolutional layer, a ResNet layer, and a ReLU activation function. It is also contemplated that the decoder layer 304 operates using a transposed convolutional process that upsamples the feature maps back to the original resolutions of image 202 and sparse depth map sample 204. For the upsampling process, CNN 300 may also include one or more skip connections 344-352 which extend from the output of layers 310-318 to the input of layers 324, 328, 332, 336, 340 (i.e., the corresponding upsampling unit layer). It is contemplated that CNN 300 may be designed to fuse the color image 202 and the sparse depth map sample 204 at layers 306-308 to prevent unwanted noise in the depth branch from flowing into the later stage of the decoder through skip connections 344-352.

Layer 354 may be designed as a final convolution layer operable to condense all the channels into one thereby forming a non-negative gray-scale depth image. It is also contemplated that layers 306, 308, and 320 may include a convolution layer designed using batch-normalization with an attached ReLU activation function. While, layer 354 may include a convolutional layer that simply includes a ReLU activation function.

Layer 356 may be designed to derive a surface normal map of the depth image. Using the intrinsic parameters of the device used to generate the color image 202 (e.g., color camera). Layer 356 may be operable to compute the gradient of the depth map in four directions and convert the depth map into 3D vectors. Layer 356 may further be operable to compute the vertex normal by averaging the normalized cross products of adjacent 3D vectors.

With reference to FIG. 2, network 200 may also include a photometric loss pathway 218 that utilizes an image alignment error between the color image 202 and the nearby color image 208 to further supervise the training of the depth regression pathway 212. Photometric loss pathway 218 may supervise the depth regression pathway 212 using the sparse depth map samples 204, the intrinsic properties of the device acquiring the image 202 (e.g., camera), and a relative transformation ($T_{1 \to 2}$).

It is contemplated that photometric loss from appearance matching may be an image warping problem typical in RGBD visual odometry. Instead of estimating the relative pose of a camera system, network 200 is designed to train the depth estimation network 212 with a fixed camera transformation. For instance, network 200 may use image 202, nearby image 208, sparse depth map sample 204, and the intrinsic parameters K of the capturing device (i.e., digital camera), and the relative transformation 226 (i.e., $T_{1 \to 2}$) to retrieve all the pixels from image 204 to the image space of image 202 thereby generating a warped image ($I_1'$). It is understood that the more accurate input the sparse depth map sample 204 (i.e., the more accurate the depth sensor) the smaller the difference will be between the warped image ($I_1'$) and image 202. System 102 may also be operable to determine the matching error between the warped image ($I_1'$) and image 202 as the supervision for determining the dense depth map 214 (i.e., $d_1$).

Network 200 may also be operable to use a known simultaneous localization and mapping or SLAM system 224 (e.g., ORBSLAM) to generate the relative transformation 226 between selected pair of frames. For instance, network 200 may receive and provide image 202 (i.e., frame 1) and a sparse depth map sample 204 (i.e., frame 2) to the SLAM system 224 which will then determine the absolute camera trajectory $T_i$. The relative transformation 226 (i.e., $T_{1 \to 2}$) of the pose between the frames may be equal to $T_1 T_2^{-1}$. It is contemplated that if the SLAM system 224 is unable to provide a robust estimate for any of the provided frames, network 200 may simply not calculate the photometric loss ($L_p$).

It is also contemplated that including the sparse depth map samples 204 as input, the estimation error may increase by a slight margin as the noise increases. However, if network 200 is not provided the sparse depth map samples 204, the error may be large and network 200 may not be able to converge the by noise more than 0.1 m. It is therefore contemplated that the SLAM system 224 assists network 200 with the training of the depth regression pathway 212. Network 200 further may operate using a SLAM system 224 to produce reliable image poses (e.g., 6-DoF pose for indoor dataset) in place of a less sophisticated PnP solvers or pose estimation networks.

After determining the transformation between the two images, network 200 may be operable to project the pixels ($p_1$) of the first image to the 3D space and then back to the second image plane ($p_1'$) using equation (1) below:

$$p_1' = KT_{1 \to 2} d_1(p_1) K^{-1} p_1 \quad \text{(Equation 1)}$$

Where, K is the intrinsic parameters of the capturing device (e.g., camera); $T_{1 \to 2}$ is the relative transformation; $d_1$ is the dense depth map 214; and $p_1$ is the pixels from the color image 202. Network 200 is then operable to bilinearly resample image 208 (i.e., $I_2$) with the second image plane ($p_1'$) calculated by equation (1) to determine a warped image ($I_1'$) using equation (2) below:

$$I_1' = I_2(p_1') \quad \text{(Equation 2)}$$

Network 200 may further determine the appearance matching loss ($L_p$) using equation (3) below:

$$L_P = \|I_1' - I_1\| = \|I_2(KT_{1 \to 2} d_1(p_1) K^{-1} p_1) - I_1(p_1)\| \quad \text{(Equation 3)}$$

With reference back to FIG. 2, the planar loss pathway 220 may be operable by receiving color image 202 to a pre-trained deep superpixel pathway. It is contemplated that the superpixel labels ($L_1$) generated from image 202 may be used to regularize the derived surface normal map 216 (i.e., $n_1$) and to determine the second derivative of depth map ($\nabla^2 d_1$) so that network 200 may further improve the training of the depth regression pathway 212. It is also contemplated that the deep superpixel pathway 222 may not be updated during training of the depth regression pathway 212. It is contemplated that when the depth regression pathway 212 is optimally trained, network 200 may be operable to generate a dense depth map 214 from a single-color image (i.e., image 202) during operation and/or testing.

It is generally understood that surface normal is one method that may be used to assist in predicting depth. However, prior approaches typically regress surface normal through supervised training with ground truth normal maps derived from depth images. Network 200 regularizes the surface normal to improve depth estimation in a self-supervised framework without the need for ground truth normal maps. It is contemplated that to avoid the need of ground truth normal maps, network 200 may require a reliable constraint more closely related to surface normal. Network 200 may operate using semantic image segmentation to avoid the need of ground truth normal maps. Network 200 may extract semantic information, such as road and trees, to guide the directions of estimated normal. For example, the estimated normal with a road label should face in an upward position. However, such use of semantic information is highly dependent on the dataset provided. For instance, training dataset 112 may be an indoor dataset such as NYUv2. For this training dataset 112, the direction of the digital camera may not be perpendicular to the ground. To adjust for camera positioning, network 200 may operate using deep superpixel pathway 222 that represents local homogeneous regions as the indicators of local planar areas to regularize normal directions.

For each image 202 provided, network 200 may determine a superpixel image 206 by using a known model that is encoded as a multi-label mask $\{S_k\}_{k=1}^{N_s}$. Network 200 may assume that a superpixel represents a planar area and the surface normal within the planar area may be in the same direction. Using this approach, network 200 may minimize the variance of the normal map pixels belonging to the same mask labels as shown by equation (4) below:

$$L_N = \Sigma_{k=1}^{N_S} \mathbf{1}_{\{p_1 \not\in E_S\}} \cdot (1-\cos(n_i, n_j)) \quad \text{(Equation 4)}$$

It is contemplated that the edge-aware smoothness of the depth map may be included to the loss function for additional depth estimation. Known approaches that implement smoothing, generally exclude the boundaries of different objects because depth may not be continuous (i.e., geometric edges or occlusion edges). It is also contemplated that analytical edges may be used for edge-aware smoothness, but Laplacian edges may include redundant edges that are caused by appearance (e.g., texture and lighting) and not by geometric relations.

Network 200 contemplates the use of superpixels to guide the smoothing process. The boundaries of adjacent superpixel regions may be defined as a superpixel edge ($E_S$). When network 200 operates on a suitable the number of superpixels, the geometric edge ($E_G$), superpixel edge ($E_S$), and the Laplacian edge ($E_L$) may follow the following inclusive relation: $E_G \subset E_S \subset E_L$. Based on this relation, network 200 may operate using the superpixel edge ($E_S$) as an approximation to the geometric edge ($E_G$). Network 200 may then penalize the $L_1$ normal of the second derivative of the generated depth map using equation (5) below:

$$L_C(d_1) = \| \mathbf{1}_{\{p_1 \not\in E_S\}} \cdot \nabla^2 d_1(p_1) \| \quad \text{(Equation 5)}$$

It is contemplated that network 200 may ignore the superpixel edges to encourage sharpness along object boundaries. Also network 200 operates to suppress additional depth discontinuities to prevent unexpected noises and error in estimated depth (e.g. salt & pepper noise, hairline noises in planar area).

Lastly, network 200 may compare the estimated depth map with the ground-truth sparse depth map sample 204 at each non-zero pixel using equation (6) below:

$$L_D = \mathbf{1}_{d_i^s > 0} \cdot |d_i^s - d_i| \quad \text{(Equation 6)}$$

It is contemplated that there may be several options for the distance function $\|\cdot\|$ (e.g., $L_1$ norm and $L_2$ norm) and the performances of different loss functions may depend on the dataset. It is also understood that empirically $L_1$ may provide enhanced performance for indoor RGBD-based datasets and $L_2$ may provide enhanced performance on outdoor LiDAR-based datasets due to the noise level in depth measurements. Lastly, it is contemplated that as the number of dataset samples decreases, network 200 may rely to a greater extent on the losses $L_P$, $L_N$, and $L_C$.

Network 200 may then calculate the final loss cost function ($L_N$) as a weighted combination of the four losses ($L_P$, $L_N$, $L_D$, and $L_C$) with a scaling factor ($\lambda$) using equation (7) below:

$$L_N = L_D + \frac{1}{4}\Sigma_{i=1}^{4}(\lambda_2 L_P^{(i)} + \lambda_3 L_N^{(i)} + \lambda_4 L_C^{(i)}) \quad \text{(Equation 7)}$$

Where the superscript $L^{(i)}$ is indicative of the scale. Network 200 may compute the last three terms using a known four-level pyramid. For the final loss cost function, network 200 may operate using different scales having the same weight. For instance, the weights for different loss terms may be empirically set to $\lambda_2=0.2$, $\lambda_3=0.8$, and $\lambda_4=0.5$.

Figure 4:
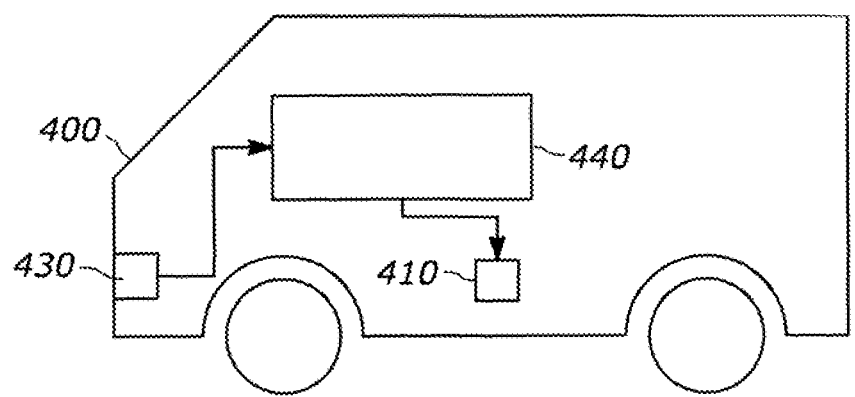
FIG. 4 illustrates a computing system controlling an at least partially autonomous robot.

FIG. 4 illustrates an embodiment in which a computing system 440 may be used to control an at least partially autonomous robot, e.g. an at least partially autonomous vehicle 400. The computing system 440 may be like the system 100 described in FIG. 1. Sensor 430 may comprise one or more video/camera sensors and/or one or more radar sensors and/or one or more ultrasonic sensors and/or one or more LiDAR sensors and/or one or more position sensors (like e.g. GPS). Some or all these sensors are preferable but not necessarily integrated in vehicle 400.

Alternatively, sensor 430 may comprise an information system for determining a state of the actuator system. The sensor 430 may collect sensor data or other information to be used by the computing system 440. One example for such an information system is a weather information system which determines a present or future state of the weather in environment. For example, using input signal x, the classifier may for example detect objects in the vicinity of the at least partially autonomous robot. Output signal y may comprise an information which characterizes where objects are located in the vicinity of the at least partially autonomous robot. Control command A may then be determined in accordance with this information, for example to avoid collisions with said detected objects.

Actuator 410, which may be integrated in vehicle 400, may be given by a brake, a propulsion system, an engine, a drivetrain, or a steering of vehicle 400. Actuator control commands may be determined such that actuator (or actuators) 410 is/are controlled such that vehicle 400 avoids collisions with said detected objects. Detected objects may also be classified according to what the classifier deems them most likely to be, e.g. pedestrians or trees, and actuator control commands A may be determined depending on the classification.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data, logic, and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A method for self-supervised depth estimation, comprising:
receiving a digital image of an environment;
extracting one or more deep superpixel segmentations from the digital image, wherein the one or more deep superpixel segmentations are partitioned to represent a homogenous area of the digital image, and wherein the one or more deep superpixel segmentations are operable as local planar regions that constrain a local normal direction and a secondary derivative of depth within the one or more deep superpixel segmentations;
generating a dense depth map using the one or more deep superpixel segmentations and
smoothing and suppressing inconsistencies within the dense depth map by minimizing a depth secondary derivative within the one or more deep superpixel segmentations.

2. The method of claim 1, further comprising:
receiving a sparse depth map sample; and
deriving a surface normal map using a depth regression neural network that regresses a full resolution depth map from the digital image and the sparse depth map sample.

3. The method of claim 2, wherein the depth regression neural network is designed using an encoder-decoder structure having an encoding layer, a decoding layer, and a plurality of skip connections.

4. The method of claim 3, wherein the encoding layer includes one or more convolutional layers, one or more rectified linear unit (ReLU) layers, one or more residual neural networks (ResNet), and one or more pooling layers.

5. The method of claim 3, wherein the decoding layer includes one or more deconvolutional layers, one or more unpooling layers, one or more residual neural networks (ResNet) layers, and one or more rectified linear unit (ReLU) layers.

6. The method of claim 5, wherein a final convolution layer operates to produce a non-negative gray-scale depth image that is used to derive the surface normal map.

7. The method of claim 2, further comprising:
computing a gradient of the sparse depth map sample in four directions;
converting the sparse depth map sample into one or more 3-dimensional vectors; and
averaging one or more normalized cross products of the one or more 3-dimensional vectors to determine a vertex normal.

8. The method of claim 1, further comprising: determining a relative transformation between the digital image and a related image using a simultaneous localization and mapping system.

9. The method of claim 8, further comprising: determining a photometric loss using the relative transformation, the digital image, and the related image.

10. The method of claim 1, further comprising negating a boundary and an edge within the one or more deep superpixel segmentations.

11. The method of claim 1, wherein the local normal direction is derived using an estimated depth.

12. The method of claim 1, further comprising applying a consistency of normal direction within each of the one or more deep superpixel segmentations.

13. A method for self-supervised depth estimation, comprising:
receiving a digital image of an environment;
extracting one or more deep superpixel segmentations from the digital image, wherein the one or more deep superpixel segmentations are partitioned to represent a homogenous area of the digital image;
generating a dense depth map using the one or more deep superpixel segmentations;
receiving a sparse depth map sample; and
deriving a surface normal map using a depth regression neural network that regresses a full resolution depth map from the digital image and the sparse depth map sample, wherein a final convolution layer operates to produce a non-negative gray-scale depth image that is used to derive the surface normal map.

14. A system for self-supervised depth estimation, comprising:
a sensor operable to receive a digital image of an environment;
a controller operable to:
extract one or more deep superpixel segmentations from the digital image, wherein the one or more deep superpixel segmentations are partitioned to represent a homogenous area of the digital image, and wherein the one or more deep superpixel segmentations are operable as local planar regions that constrain a local normal direction and secondary derivative of depth within the one or more deep superpixel segmentations;
generate a dense depth map using the one or more deep superpixel segmentations; and
smooth and suppress inconsistencies within the dense depth map by minimizing a depth secondary derivative within the one or more deep superpixel segmentations.

15. The system of claim 14, further comprising:
a depth sensor operable to receive a sparse depth map sample; and
the controller further being operable to:
derive a surface normal map using a depth regression neural network that regresses a full resolution depth map from the digital image and the sparse depth map sample.

16. The system of claim 15, wherein the sensor is a digital camera and the depth sensor is a LiDAR sensor.

17. The system of claim 15, the controller further being operable to: negate a boundary and an edge within the one or more deep superpixel segmentations.

18. The system of claim 15, the controller further being operable to: determine a relative transformation between the digital image and a related image using a simultaneous localization and mapping system.

* * * * *